United States Patent [19]
Jacobs et al.

[11] Patent Number: 5,806,812
[45] Date of Patent: Sep. 15, 1998

[54] ADJUSTABLE ATTACHMENT UNIT

[75] Inventors: Dennis F. Jacobs, Columbus, Ohio; Michael J. Gniewek, Livonia, Mich.; Lawrence Suwinski, Clinton Township, Mich.; Dennis A. Wickerham, Sterling Heights, Mich.

[73] Assignee: UT Automotive Dearborn, Inc., Dearborn, Mich.

[21] Appl. No.: 766,446

[22] Filed: Dec. 12, 1996

[51] Int. Cl.$^6$ ........................................ F16L 3/00
[52] U.S. Cl. .............................................. 248/73
[58] Field of Search ...................... 248/73, 74.1, 74.2, 248/65, 71; 174/72 A

[56] References Cited

U.S. PATENT DOCUMENTS

| | | | |
|---|---|---|---|
| 2,375,513 | 5/1945 | Bach | 248/73 X |
| 3,761,603 | 9/1973 | Hays et al. | 174/72 A |
| 4,918,261 | 4/1990 | Takahashi et al. | 248/73 X |
| 5,160,812 | 11/1992 | Takahashi et al. | 248/73 X |
| 5,257,768 | 11/1993 | Juenemann et al. | 248/73 X |

*Primary Examiner*—Ramon O. Ramirez
*Attorney, Agent, or Firm*—Howard & Howard

[57] ABSTRACT

An attachment unit for securing a wire harness to a vehicle body includes a support and a retainer. The support includes a longitudinally extending slot, and a longitudinally extending channel. The retainer includes a base and a shaft extending from the base. The retainer shaft is inserted into the slot so that the base is within the shaped channel. The unit is taped to the wire harness, and the retainer is free to move within the slot during installation, so that the retainer can be aligned with holes in the vehicle body. Once the shaft is inserted into the hole in the vehicle the attached wire harness is securely in place.

9 Claims, 3 Drawing Sheets

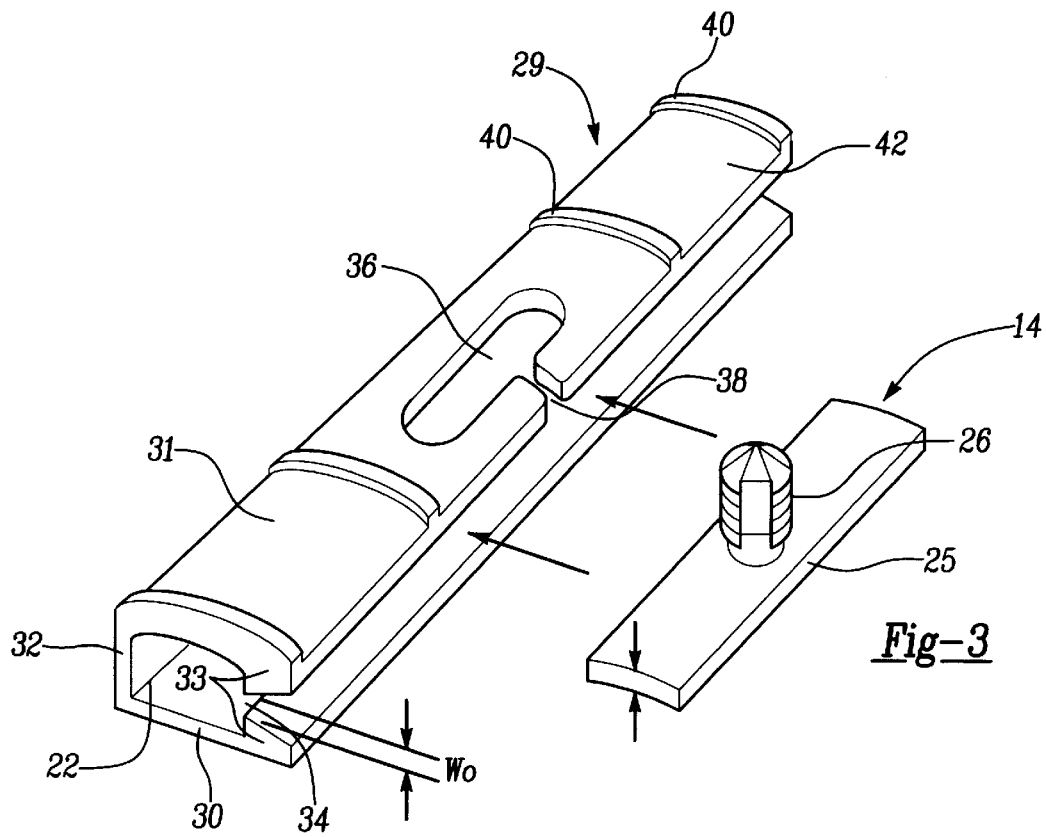
*Fig-3*
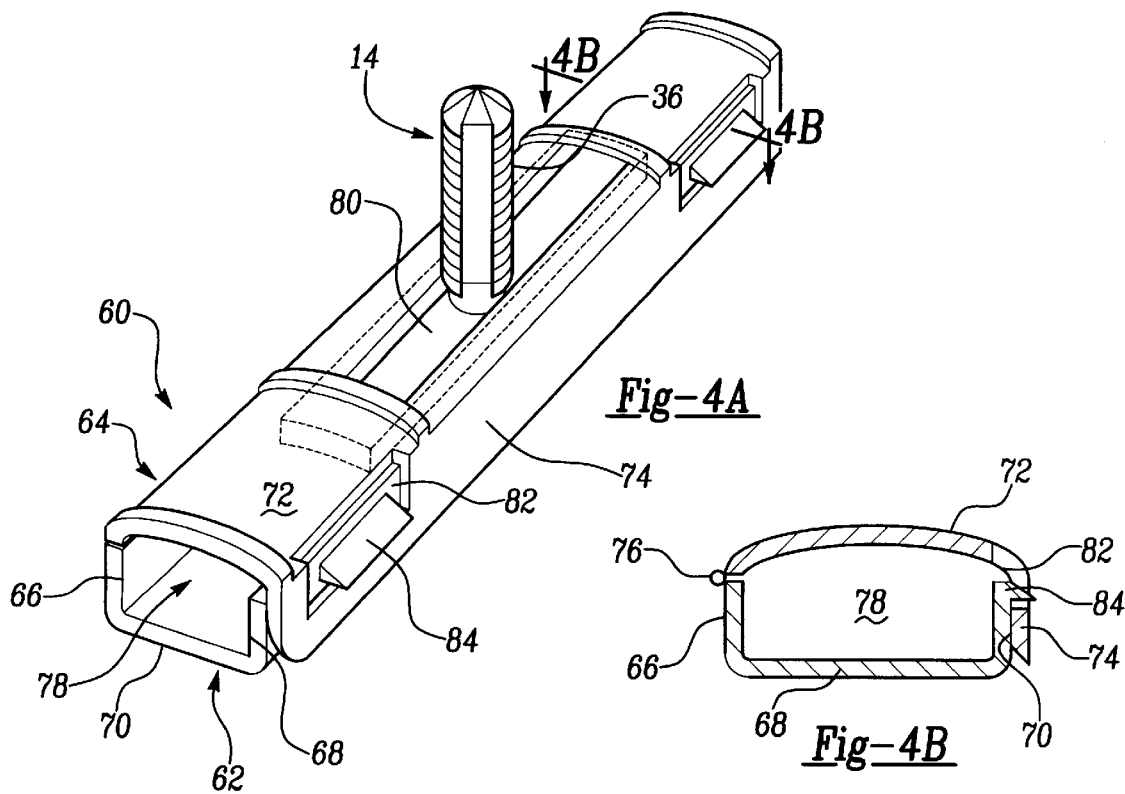
*Fig-4A*
*Fig-4B*

ADJUSTABLE ATTACHMENT UNIT

TECHNICAL ART

The present invention relates to wire harness attachment units, and more particularly to adjustable wire harness attachment units.

BACKGROUND ART

In many applications, independent wires are grouped and bound into a single bundle, commonly referred to as a wire harness. To be routed or installed correctly, wire harnesses often must be attached to the housing of the device they service. In, for example, automotive applications retainers are used for attachment.

Conventional retainers include a base and a ribbed shaft extending from the center of the base. The base is taped to the wire harness in a fixed position. Once taped, the retainer shaft is inserted into a hole in the vehicle body. The ribs on the shaft secure the attachment unit, and consequently the wire harness to the vehicle.

Attaching units, which include a rectangular support and the retainer, can also be used. The support has a circular hole centrally disposed therethrough. In use the shaft of the retainer is disposed through the hole in the support until the base mates with the support. The support is then taped to the wire harness so that both support and retainer are attached to the wire harness in a fixed position. Although these attachment procedures enjoy popularity amongst the automakers, problems do exist. Due to tolerance variations in hole position and harness stiffness, quite often it is difficult or impossible to align the rigidly positioned retainers with the corresponding holes in the auto. As a result, during attachment retainers must be relocated on the harness, or new holes must be created, or some retainers are left unattached. All of these solutions are costly and unreliable.

Therefore an improved attachment unit is sought, which increases the reliability of harness installation to the vehicle.

SUMMARY OF THE INVENTION

Objects of the present invention include providing of a wire harness retainer support with means to adjust the position of the wire harness retainer.

According to one aspect of the present invention, a wire harness is provided with an attachment unit including a support and retainer. The support comprises a longitudinally extending slot disposed in a wall of the support. The support further includes a longitudinally extending channel. The retainer includes a base and a shaft extending from the base.

When the support and retainer are coupled together, the retainer shaft extends through the support. The base of the retainer rests in the channel. Once coupled, the retainer and the support are then attached to the harness in a predetermined position along the length of the harness corresponding to a retainer hole disposed in the automobile. The attachment unit is typically taped to the harness with the retainer shaft extending outward from the harness. The retainer shaft may be slid back and forth within the slot of the support while attached to the harness to align the retainer with the mating retainer hole within the sheet metal of the automobile. Once the retainer, which is attached to the harness by the support, is aligned with mating hole, the harness can be attached to the automobile simply by inserting the retainer in the hole.

Advantages of the present invention include adjustability of the retainer when coupled with the support. Movement of the retainer allows alignment of the retainer with the hole provided and eliminates the need for realignment procedures during the installation of the harness. Moreover, hole position tolerances, within an automobile chassis for example, may be relaxed, further reducing the cost of harness installation within the automobile.

The foregoing invention will become more apparent in the following detailed description of the best mode for carrying out the invention and in the accompanying drawings.

BRIEF DESCRIPTION OF THE DRAWING

FIG. 3 is a perspective view of another embodiment of the attachment unit of the present invention.

FIG. 4A is a perspective view of another embodiment of the attachment unit.

FIG. 4B a left side view of the attachment unit as shown in FIG. 4A.

BEST MODE FOR CARRYING OUT THE INVENTION

Figure 1:
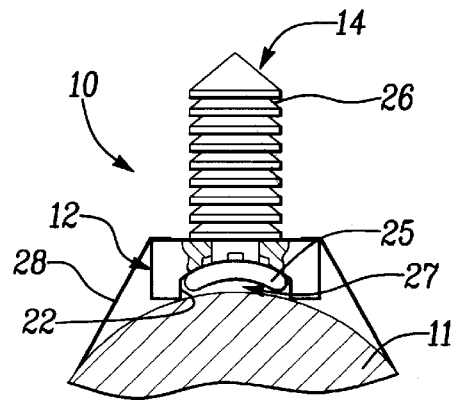
FIG. 1 is a right side view of an attachment unit of the present invention.

Now referring to FIG. 1, an attachment unit 10 for attaching a wire harness 11 to a vehicle body (not shown) includes a support 12 and a retainer 14.

Figure 2A:
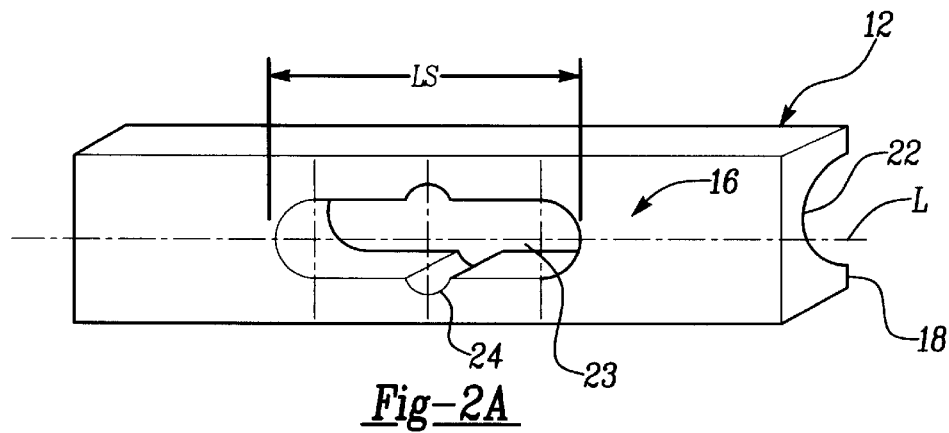
FIG. 2A is a perspective view of a support as shown in FIG. 1.

Referring to FIG. 2A, the support 12 is a wall structure including first face 16, spaced opposed second face 18. The second face 18 having a C-shaped channel 22 formed therein. The support 12 also includes a longitudinally extending axis L. A partial longitudinally extending slot 23 is disposed through the first and second faces 16 and 18, respectively. The slot length is represented by the arrow LS.

The slot 23 further includes an optional larger diameter hole 24 centered in the slot 14. The centered hole 24 provides a "null" center point for locating the retainer 14 prior to vehicle installation.

Figure 2B:
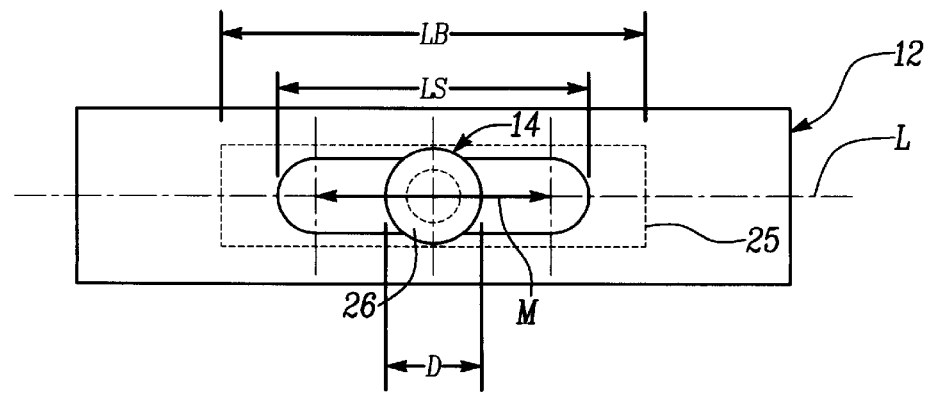
FIG. 2B is a top view the attachment unit as shown in FIG. 2A.

Referring to FIGS. 1 and 2B, the retainer 14, includes a base 25 and a ribbed shaft 26 extending from the center of the base 25. The base's cross-sectional contour matches the contour of the channel 22. In this embodiment, the base 25 and the channel 22 have a curved U-shaped contour. The base length is represented by the arrow LB. The diameter of the shaft 26 is represented by the arrow D. The length of the slot LS is greater than the diameter of the shaft D and less than the length of the base LB. The geometry of the unit allows for a gap 27 between the base 25 and the wire harness 11.

Use of the attachment unit 10 will now be discused with reference to an automobile application. Referring to FIGS. 1 and 2A, the retainer shaft 26 is disposed through the support slot 23, until the base 25 mates with the channel 22. The retainer 14 is positioned so that the shaft 26 rests within the centered hole 24. The tape 28 is used to secure the support 12 to the wire harness 11 in a predetermined position along the harness corresponding to a hole (not shown) within the automobile sheet metal.

Once taped, the free ends of the support 12 contact the wire harness 11, and the retainer 14 is free to slide within the channel 22, since the length of the slot LS is greater than the diameter of the retainer and less than the length of the base LB. The movement of the retainer 14 is illustrated by the arrow M (as shown in FIG. 2B). The gap 27 allows the retainer 14 to move more freely. By centering the retainer 14 in the support 12, the retainer 14 is free to move fully along the slot length LS, if necessary.

When the retainer shaft 26 is aligned with the mating hole (not shown), the shaft is inserted into the hole. The shaft ribs secure the attachment unit 10 and consequently the wire harness 11 to the automobile. Since the centered hole 24 gives the retainer 14 a fixed position, the hole prevents the retainer 14 from sliding around freely. Thus, making aligning the retainer 14 to the hole (not shown) easier.

Using the attachment unit 10 with the adjustable retainer 14 allows alignment of subsequent retainers to holes during the installation of the harness. Moreover, hole position tolerances, within the automobile chassis may be relaxed, further reducing the cost of harness installation within the automobile.

Referring to FIG. 3, a support 29 has been modified so that a C-shaped wall structure is formed by a first wall 30, a spaced opposed second wall 31, and a third wall 32 extending there between. The free edges of the first and second walls 30 and 31 have protrusions 33 extending therefrom. The protrusions 33 are beveled to form an opening 34. The opening 34 has a width $W_o$. The support has been further modified so that the slot 36 is disposed through the second wall 31. There is also an opening 38 which extends from the slot 36 to the free end of the second wall 31. The second wall 31 further includes a plurality of longitudinally spaced, transversely extending ridges 40 which define two taping areas 42.

Use of the support 30 will now be discussed. The retainer base 25 is inserted into the channel 22 via the opening 34, and the shaft 26 is disposed in the slot 36 via the opening 38. It is preferred that the retainer 14 have a retainer base width $W_b$ greater than the opening width $W_o$, so that the retainer 14 once inserted will not slip out of the channel 22.

Tape (not shown) is applied to the support 30 on the taping areas 42, as well as to the wire harness (not shown). The tape allows the protrusions 33 to come together closing the opening 34, thus securing the retainer 14 within the channel 22. However, the retainer 14 is free to move during the remainder of installation, since the shaft 26 is within the slot 36. This embodiment of the support 30 is formed of plastic and is molded as a one piece structure.

Referring to FIGS. 4A and B, a support 60 includes a lower portion 62 which is a C-shaped wall structure and an upper portion 64 which is an L-shaped wall structure. The lower portion 62 includes first wall 66, second wall 68, and third wall 70 extending therebetween. The upper portion 64 includes fourth and fifth walls 72 and 74.

The lower portion 62 and the upper portion 64 are joined by a hinge 76 along the free edges of the first wall 66 and the fourth wall 72. The hinge 76 allows the upper portion 64 to pivot between an opened and a closed position. The hinge 76 is part of the mold and allows for folding over of the upper portion 64 and closing of the support 60. When closed, a channel 78 is formed by the walls, and the fifth wall 74 is disposed outwardly of the third wall 70.

The fourth wall 72 includes a longitudinally extending slot 80 disposed therethrough, and ridges 82 as discussed above. In this embodiment, the slot 80 is rectangular instead of oval shaped. The third wall 70 includes two longitudinally spaced protrusions 82 which extend outwardly. The fifth wall 74 includes two longitudinally spaced slots 84. The protrusions 82 and slots 84 are a locking means formed so that when the support 60 is closed, the protrusions 82 extend through the slots 84 to lock the support 60.

Use of the support 60 will now be discussed with reference to FIG. 5A. While the support 60 is open, the retainer shaft 26 is disposed within the slot 80. Once closed and locked, the retainer base 25 is within the channel 78, and the retainer 14 is free to slide during wire harness attachment.

Figure 5A:
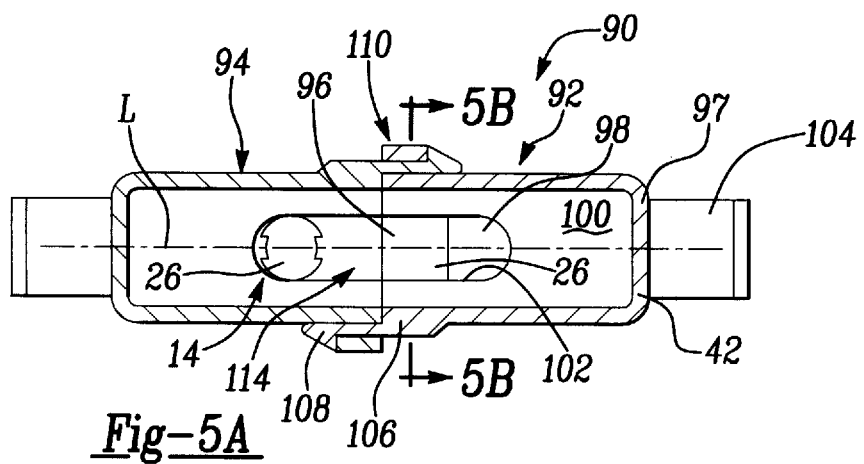
FIG. 5A is a top view of the retainer within another embodiment of the support.
Figure 5B:
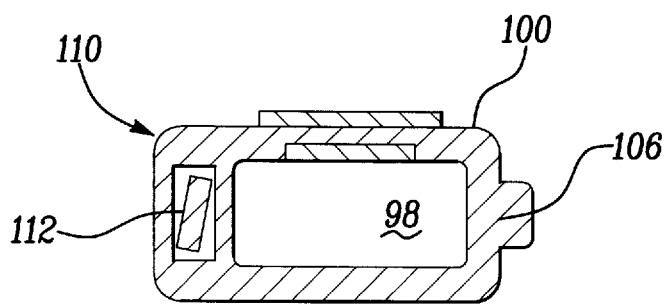
FIG. 5B a cross-section view along line 5B—5B of FIG. 5A of the support.

Referring to FIGS. 5A and B, a modified support 90 includes two pieces 92 and 94. Each molded piece 92 is a rectangular box-shaped wall structure having an open end 96, an opposed end wall 97 and a channel 98 defined by the walls. The upper wall 100 of each piece includes a longitudinally extending U-shaped cutout 102. The cutout 102 is open at the piece's open end 96. An optional extension portion 104 extends from the end wall 97.

One side wall includes a finger 106, which extends longitudinally away from the piece. The finger 106 includes a projection 108 at the free end. The opposed side wall includes a socket 110. The socket 110 defines a locking channel 112 adjacent the side wall. On mating piece 94 the finger and the socket are located on the reverse side walls, and are a means for locking the first and second pieces 92 and 94, respectively.

Use of the support 90 will now be discussed. Referring to FIGS. 5A and B, the retainer base 25 is disposed within the channels 102 of the pieces 92 and 94, and the pieces are brought together so that the fingers 106 of one piece enter the socket locking channels 112 of the other piece. Once the pieces are joined the protrusions 108 abut against the socket 110, thus minimizing the ability of the pieces to separate.

A slot 114 is formed by the alignment of the cutouts 102 in each piece, and the retainer shaft 26 is disposed within the slot 114. The support 90 is taped to the wire harness (not shown) using the extension portions 104. Once taped, the retainer 14 can slide within the channel 98. With the channel 98 being fully enclosed by the box-shaped wall structure the retainer 14 can move smoothly.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include but are not limited to modifying the shape and dimensions of the slot. It is therefore contemplated that the appended claims will cover any such modification or embodiments that fall within the true scope of the invention.

We claim:

1. A support for receiving a retainer having a base and a shaft extending from the base, said support for use with a wire harness, wherein said support comprises:

a longitudinally extending slot disposed therethrough;

a longitudinally extending shaped channel;

means for attaching said support to a wire harness;

wherein upon insertion of the shaft through said slot, the base is disposed within said channel, and upon attaching said support to the wire harness said shaped channel permits said retainer to move; and the center of said slot including a hole with a larger diameter than the width of said slot.

2. The support of claim 1, wherein the base and the channel are C-shaped.

3. A support for receiving a retainer having a base and a shaft extending from the base, said support for use with a wire harness, wherein said support comprises:
   a C-shaped wall structure, one of said walls having a longitudinally extending slot, said wall structure forming a shaped channel therein;
   means for attaching said support to a wire harness;
   wherein upon insertion of the shaft through said slot, the base is disposed within said channel, and upon attached said support to the wire harness said shaped channel permits said retainer to move; and
   free edges of said wall structure including longitudinally extending protrusions which form a longitudinally extending opening into said channel and said side wall further including an opening from said slot to said free edge.

4. The support of claim 3, wherein the center of said slot includes a hole with a larger diameter than the width of said slot.

5. The support of claim 3, wherein the base and the channel are C-shaped.

6. A support for receiving a retainer having a base and a shaft extending from the base, said support for use with a wire harness, wherein said support comprises:
   a first rectangular box like piece including an open end and a wall having a partial longitudinally extending cutout open at said open end;
   a second rectangular piece including an open end and a wall having a partial longitudinally extending cutout open at said open end; and
   a means for locking said first piece to said second piece, such that upon joining said pieces said cutouts form a longitudinally extending slot, said slot having a length greater than the diameter of the shaft and less than the length of the base, and a longitudinally extending shaped channel is formed within said pieces;
   wherein upon insertion of the shaft through said slot, the base is disposed within said channel, and upon attaching said support to said wire harness said shaped channel permits said retainer to move.

7. The support of claim 6, wherein the means for locking includes each piece having a finger on one side and a socket on the other side, such that upon joining said pieces each finger enters the socket on the other piece.

8. A support for receiving a retainer having a base and a shaft extending from the base, said support for use with a wire harness, wherein said support comprises:
   a C-shaped wall structure;
   an L-shaped wall structure; said L-shaped wall structure having a longitudinally extending slot;
   a hinge pivotally connecting the structures together so that a portion of the L-shaped structure overlaps with one of said side walls of the C-shaped structure, so that a shaped channel is formed therein;
   wherein upon insertion of the shaft through said slot, the base is disposed within said channel, and upon attaching said support to said wire harness said shaped channel permits said retainer to move.

9. The support of claim 8, wherein the support further includes a locking means.

* * * * *